United States Patent Office 3,465,001
Patented Sept. 2, 1969

3,465,001
MALEIMIDO ARYLOXY ALKANOIC ACIDS, ALKYL ESTERS AND AMIDES THEREOF
William A. Bolhofer, Frederick, and John J. Baldwin, Lansdale, Pa., assignors to Merck & Co., Inc., Rahway, N.J., a corporation of New Jersey
No Drawing. Filed Mar. 31, 1966, Ser. No. 538,957
Int. Cl. C07d 27/28; A61k 27/00
U.S. Cl. 260—326.3                                           10 Claims

ABSTRACT OF THE DISCLOSURE (Maleamidoaryloxy) alkonic acid products wherein the maleamido nucleus may be substituted by from one to two halogen, alkyl, aryl or substituted aryl moieties or by a divalent hydrocarbylene chain and the salts, esters and amide derivatives thereof. The said products are diuretic and saluretic agents which are useful in the treatment of conditions associated with edema.

---

The products are prepared by two routes: (1) via the reaction of an appropriate maleic anhydride with a nuclear amino substituted aryloxyalkanoic acid, or (2) by treating a N-(carboxyalkoxyaryl)maleamic acid with a lower alkanoic acid anhydride in the presence of a base.

This invention relates to a new class of chemical compounds which can be described generally as (maleimidoaryloxy)alkanoic acids and to the nontoxic, pharmacologically acceptable salts, esters and amide derivatives thereof.

Also, it is an object of this invention to describe a novel method of preparation for the aforementioned (maleimidoaryloxy)alkanoic acids, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The (maleimidoaryloxy)alkanoic acids of this invention are products having the following general formula:

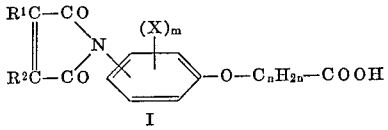

I wherein $R^1$ and $R^2$ are similar or dissimilar members selected from the group consisting of hydrogen, halogen, alkyl, for example, lower alkyl, aryl such as mononuclear aryl, substituted aryl such as mono-substituted mononuclear aryl wherein the nuclear substituents are halogen, alkyl or alkoxy and, taken together, $R^1$ and $R^2$ may be joined to form an alkylene chain containing from three to four carbon atoms between their points of attachment to the maleimido ring; the X radicals are similar or dissimilar members selected from the group consisting of hydrogen, halogen, alkyl, for example, lower alkyl, alkoxy, for example, lower alkoxy and, taken together, two X radicals on adjacent carbon atoms of the benzene ring may be joined to form an hydrocarbylene chain (i.e., a divalent organic radical composed solely of carbon and hydrogen) containing from three to four carbon atoms between their points of attachment to the benzene ring, for example, trimethylene, tetramethylene, 1,3-butadienylene (i.e., —CH=CH—CH=CH—), etc. wherein at least one of $R^1$, $R^2$ and X represents a group other than hydrogen; $m$ is an integer having a value of one to four and $n$ is an integer having a value of one to four.

A preferred embodiment of this invention relates to (4-maleimidophenoxy)acetic acids having the following structural formula:

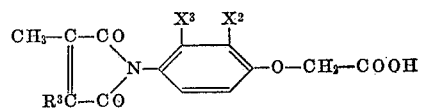

wherein $R^3$ is a member selected from the group consisting of hydrogen, halogen and lower alkyl and $X^2$ and $X^3$ are similar or dissimilar members selected from the group consisting of hydrogen, halogen, lower alkyl and, taken together, may be joined to form a 1,3-butadieneylene chain (i.e., —CH=CH—CH=CH—). The foregoing class of compounds exhibits particularly good diuretic and saluretic activity and represents a preferred subgroup of compounds within the scope of this invention.

The (maleimidoaryloxy)alkanoic acids (I) of this invention are conveniently prepared by several alternate processes, the choice of which depends largely upon the number and, also, upon the steric and electronic characteristics, of the substituents on the maleimido ring. When, for example, the maleimido nucleus in the final product (I) contains two substituents or, alternatively, when the maleimido ring is mono-substituted by an halogen, aryl or a substituted aryl radical, the said products are most conveniently synthesized by treating an appropriate maleic anhydride (II, infra) with a nuclear amino substituted aryloxyalkanoic acid (III, infra) in an organic carboxylic acid solvent. The reaction is facilitated by the application of heat as, for example, by heating the reaction mixture at reflux temperatures for ashort period, followed by cooling of the reaction mixture thus obtained to effect crystallization of the product (I). The following equation illustrates this method of preparation:

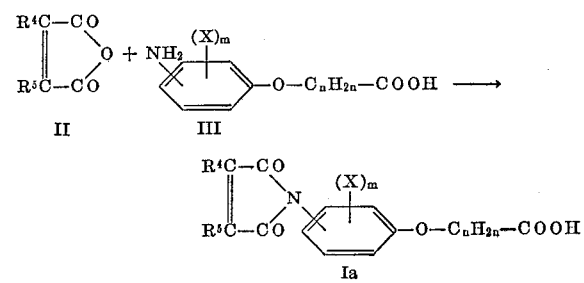

wherein X, $m$ and $n$ are as defined above and $R^4$ and $R^5$ are members selected from the group consisting of hydrogen, halogen, alkyl, aryl or mono-substituted aryl, at least one of which is an halogen, aryl or a mono-substituted aryl radical, with the proviso that when either $R^4$ or $R^5$ is hydrogen the remaining $R^4$ or $R^5$ radical is other than alkyl.

The second principal method for preparing the (maleimidoaryloxy)alkanoic acids (I) of this invention relates (a) to the preparation of those products which are unsubstituted on the maleimido ring (i.e., $R^1$ and $R^2$ in planar Formula I, supra, represent hydrogen), (b) to the preparation of those products which contain a single alkyl substituent on the maleimido nucleus (i.e., either $R^1$ or $R^2$ in planar Formula I, supra, represents alkyl) and, also, (c) to the preparation of products in which the carbon atoms adjacent to each carbonyl group on the maleimido nucleus are joined by an alkylene chain. These products are conveniently prepared by treating an N-(carboxyalkoxyaryl)maleamic acid (IV, infra) with a basic reagent such as sodium acetate, triethylamine, etc., in the presence of a suitable reagent as, for example, in an appropriate lower alkanoic acid anhydride such as acetic anhydride, propionic anhydride, etc. which may be present in excess to also serve as the reaction solvent. The following equation illustrates this method of preparation:

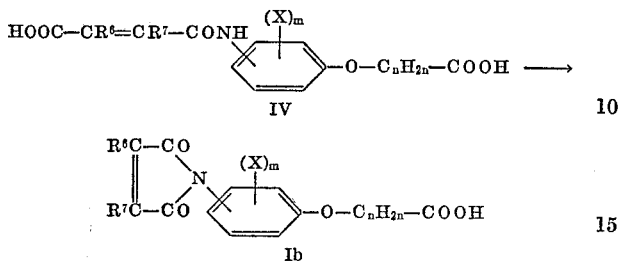

wherein X, m and n are as defined above and $R^6$ and $R^7$ are members selected from the group consisting of hydrogen and alkyl, at least one of which is hydrogen, or, taken together, $R^6$ and $R^7$ may be joined to form an alkylene chain containing from three to four carbon atoms between their points of attachment to the maleimido ring.

The nuclear amino substituted aryloxyalkanoic acids (III) employed as starting materials in the process of this invention are prepared from the appropriate nitrophenol by known methods. Thus, for example, a nitrophenol (V, infra), which may be obtained from the corresponding phenol by the treatment thereof with nitric acid in a suitable solvent is converted to its sodium salt by treatment with an alkali metal alkoxide in alcohol and then allowed to react with an ester of an haloalkanoic acid, and the (nitrophenoxy)alkanoic acid ester (VI) thus formed is treated with a reducing agent as, for example, with hydrogen in the presence of a ruthenium on carbon catalyst, to convert the nitro derivative to the corresponding (aminophenoxy)alkanoic acid ester (VII), and the said ester (VII) is then saponified by conventional means to the desired acid (III). The following equation, wherein the alkali metal alkoxide reagent employed is sodium ethoxide, illustrates this method of preparation:

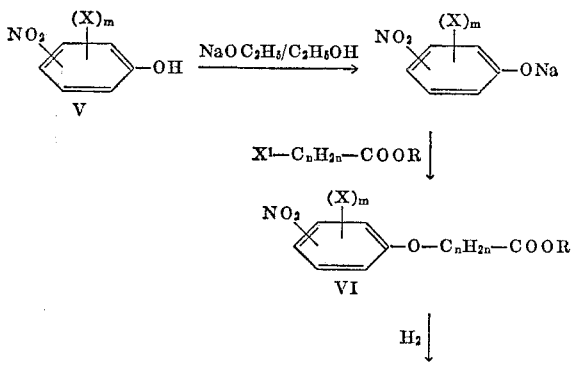

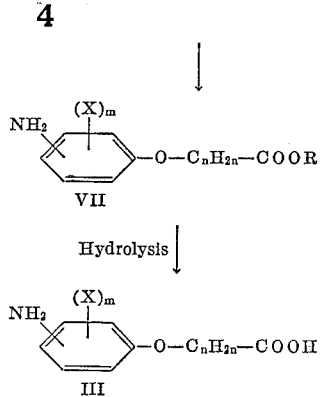

wherein X, m and n are as defined above; R is an hydrocarbyl radical, that is, an organic radical composed solely of carbon and hydrogen such as alkyl, etc. and $X^1$ is halogen, for example, chlorine, bromine, etc.

The N-(carboxyalkoxyaryl)maleamic acid starting materials (IV) described above in connection with the second principal method for preparing the instant products (I) are synthesized by either of two alternate routes. According to one method, a suitable maleic anhydride (VIII, infra) is reacted with an appropriate nuclear amino substituted aryloxyalkanoic acid (III) in a suitable solvent, and with the application of heat, to obtain the desired N-(carboxyalkoxyaryl)maleamic acid (IV). The following equation illustrates this method of preparation:

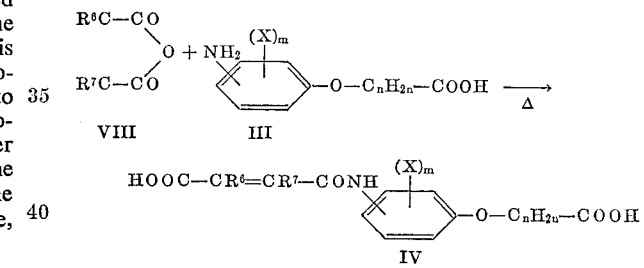

wherein $R^6$, $R^7$, X, m and n are as defined above.

The second method by which the N-(carboxyalkoxyaryl)maleamic acid derivatives (IV) may be obtained consists in treating an N-(hydroxy substituted aryl) maleamic acid (IX, infra) with alkali metal alkoxide in alcohol and then with an haloalkanoic acid ester to obtain the ester of N-(carboxyalkoxyaryl)maleamic acid which is then saponified by treatment with an aqueous solution of a base followed by neutralization with acid to yield the desired N-(carboxyalkoxyaryl)maleamic acid (IV). Suitable bases and acids which may be employed in the process include, for example, sodium hydroxide, hydrochloric acid, etc. The following equation illustrates this method of preparation:

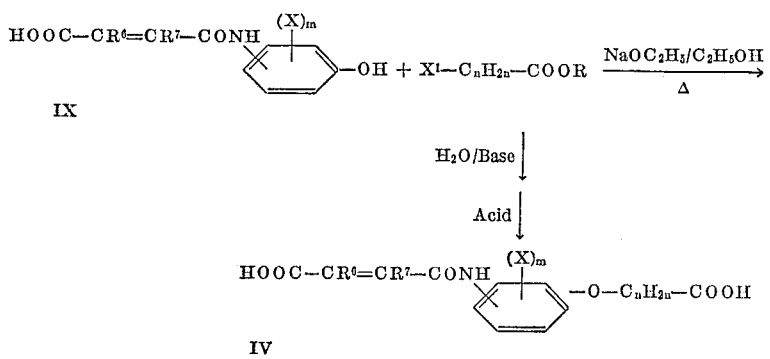

wherein R, $R^6$, $R^7$, X, $X^1$, m and n are as defined above.

The (maleimidoaryloxy)alkanoic acids (I) of this invention are generally obtained as crystalline solids and, if desired, may be purified by recrystallization from a suitable solvent. Suitable solvents include, for example, acetic acid, acetonitrile, isopropyl alcohol, ethylene chloride, etc. or mixtures of solvents such as a mixture of acetone and water, ethylene chloride and hexane, isopropyl alcohol and water etc.

Included within the scope of this invention are the non-toxic, pharmacologically acceptable acid addition salts of the instant products (I). In general, any base which will form an acid addition salt with the (maleimidoaryloxy) alkanoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc.

Also included within the scope of this invention are the ester and amide derivatives of the instant (maleimidoaryloxy)alkanoic acids (I) which may be prepared by several methods. According to one method the said ester and amide derivatives are prepared by employing as reactants in the process of this invention the appropriate ester or amide derivatives of the nuclear amino substituted aryloxyalkanoic acid starting materials (III, supra) described above in connection with the first principal method for preparing the instant products (I). Another method for preparing the amide derivatives consists in the reaction of a (maleimidoaryloxy)alkanoic acid (I) with a special reagent such as dicyclohexylcarbodiimide, N-ethyl - 5 - phenylisoxazolium - 3' - sulfonate, 1,1'-carbonyldiimidazole, 1,1' - thionyldiimidazole, etc. and treating the intermediate thus formed with ammonia or with a suitable amine to form the corresponding amide product. These and other equivalent methods for the preparation of the ester and amide derivatives of the instant products (I) will be apparent to those having ordinary skill in the art and to the extent that the said derivatives are both nontoxic and physiologically acceptable to the body system, the said esters and amides are the functional equivalents of the corresponding (maleimidoaryloxy)alkanoic acids (I).

The examples which follow illustrate the (maleimidoaryloxy)alkanoic acids (I) of the invention and the method by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

(3-chloro-4-dimethylmaleimidophenoxy)acetic acid

Step A: Ethyl (3 - chloro - 4 - nitrophenoxy)acetate.—Sodium (20.4 g., 0.887 mole) is dissolved in absolute ethanol (750 ml.). To this solution is added 3-chloro-4-nitrophenol (154 g., 0.887 mole) dissolved in absolute ethanol (200 ml.). The solution is heated to boiling and ethyl bromoacetate (148 g., 0.887 mole) is added. The mixture then is heated for 16 hours, the alcohol distilled and water is added to the residue. The mixture is extracted with ether and the ether extract dried and evaporated. The residue is crystallized from ethanol to give 140 g. of ethyl (3 - chloro - 4 - nitrophenoxy)acetate, M.P. 59–60° C.

Analysis.—Calculated for $C_{10}H_{10}ClNO_5$: C, 46.25; H, 3.88. Found: C, 56.60; H, 3.92.

Step B: Ethyl (3 - chloro - 4-aminophenoxy)acetate.—To a slurry of 10% ruthenium on carbon (1.5 g.) in ethanol, there is added a slurry of ethyl (3-chloro-4-nitrophenyl)acetate (51.94 g., 0.02 mole) in ethanol (250 ml.). The mixture is hydrogenated in a Parr apparatus, the calculated amount of hydrogen being absorbed in 23 hours. Removal of the catalyst and solvent leaves ethyl (3 - chloro - 4 - aminophenoxy)acetate (43 g.) which melts at approximately 67° C. This product is the next step without further purification.

Step C: (3 - chloro - 4 - aminophenoxy)acetic Acid.—Ethyl 3 - chloro - 4 - aminophenoxy acetate (18 g.) is added to 100 ml. of 1 N sodium hydroxide and the suspension is heated at 100° C. until solution is complete. The solution is filtered and acidified with 100 ml. of 1 N hydrochloric acid. The solution is cooled and the crystallized product thus obtained is filtered to yield 14.8 g. of (3 - chloro - 4 - aminophenoxy)acetic acid having a melting point of 165–167° C.

Step D: (3 - chloro - 4 - dimethylmaleimidophenoxy) acetic acid.—Dimethylmaleic anhydride (0.69 g., 0.007 mole) is added to a suspension of (3 - chloro-4-aminophenoxy)acetic acid (1.41 g., 0.007 mole) in 20 ml. of acetic acid. The mixture is heated to reflux and then is allowed to cool slowly to 25° C. The product thus obtained crystallizes, is filtered and then is recrystallized from a mixture of acetone and water to yield to (3-chloro-4-dimethylmaleimidophenoxy)acetic acid which melts at 176–177.5° C.

Analysis.—Calculated for $C_{14}H_{12}ClNO_5$: C, 54.29; H, 3.91; N, 4.52. Found: C, 54.02; H, 3.97; N, 4.50.

EXAMPLE 2

(3-chloro-4-maleimidophenoxy)acetic acid

Step A: N-(2-chloro-4-carboxymethoxyphenyl)maleamic acid.—A solution of maleic anhydride (1.96 g., 0.02 mole) in 10 ml. of acetic acid is added to a solution of (3-chloro-4-aminophenoxy)acetic acid (4.0 g., 0.02 mole) in 50 ml. of acetic acid at reflux. The solution is allowed to cool slowly to 25° C. The crystalline product thus obtained is filtered to yield 5.5 g. of N-(2-chloro-4-carboxymethoxyphenyl)maleamic acid which melts at 151–152.5° C.

Step B: (3-chloro-4-maleimidophenoxy)acetic acid.—N-(2 - chloro - 4 - carboxymethoxyphenyl)maleamic acid (1.3 g., 0.005 mole) is dissolved in 5 ml. of acetic anhydride containing triethylamine (1.5 g., 0.015 mole). The solution is heated at 100° C. for 15 minutes and is then poured into cold, dilute hydrochloric acid. After hydrolysis of the acetic anhydride is complete the mixture is extracted with ethyl acetate. The extract is dried over sodium sulfate and concentrated to yield an oil which is dissolved in ether and the resulting solution decanted from insoluble residue. Concentration of the ether yields 1.7 g. of crude (3-chloro-4-maleimidophenoxy)acetic acid which, after recrystallization from a mixture of acetone and water, melts at 128–130° C.

Analysis.—Calculated for $C_{12}H_8ClNO_5$: C, 51.17; H, 2.86; N, 4.97. Found: C, 51.30; H, 3.11; N, 4.90.

EXAMPLE 3

(4-dichloromaleimido-1-naphthyloxy)acetic acid

Dichloromaleic anhydride (1.2 g., 0.007 mole) is added to a suspension of 4-amino-1-naphthyloxyacetic acid (1.5 g., 0.007 mole) in 20 ml. of acetic acid. The mixture is heated to reflux and then is allowed to cool slowly to 25° C. The product thus obtained crystallizes, is filtered, and then is recrystallized from acetic acid to yield 1.4 g. of (4-dichloromaleimido-1-naphthyloxy)acetic acid having a melting point of 255–257° C.

Analysis.—Calculated for $C_{16}H_9Cl_2NO_5$: C, 52.48; H, 2.48; N, 3.83. Found: C, 52.60; H, 2.86; N, 3.69.

EXAMPLE 4

(4-maleimido-1-naphthyloxy)acetic acid

Step A: N-(4-carboxymethoxy-1-naphthyl)maleamic acid.—N-(4-hydroxy-1-naphthyl)maleamic acid dihydrate (13.9 g., 0.05 mole) is added to a solution of sodium ethoxide (0.11 mole) in 100 ml. of ethanol. After stirring for five minutes, ethyl bromoacetate (18.4 g., 0.11 mole) is added and the solution refluxed for two hours. Sodium hydroxide (7.2 g., 0.18 mole) in 50 ml. of water is added and the solution stirred 15 minutes without external heat. The solution is acidified with hydrochloric acid and diluted to 450 ml. with water. On cooling the N-(4-carboxymethoxy-1-naphthyl)maleamic acid crystallizes and is filtered. Recrystallization from isopropyl alcohol yields 3 g. of N-(4-carboxymethoxy-1-naphthyl)maleamic acid which melts at 202–205° C.

Step B: (4-maleimido-1-naphthyloxy)acetic acid.—By following the procedure described in Example 2, Step B, but substituting N-(4-carboxymethoxy-1-naphthyl)maleamic acid for the N-(2-chloro-4-carboxymethoxyphenyl)-maleamic acid recited therein, the product (4-maleimido-1-naphthyloxy)acetic acid is obtained. The product is recrystallized from a mixture of acetone and water to yield (4-maleimido-1-naphthyloxy)acetic acid which melts at 210–213° C.

Analysis.—Calculated for $C_{16}H_{11}NO_5$: C, 64.64; H, 3.73; N, 4.71. Found: C, 64.47; H, 3.80; N, 4.75.

EXAMPLE 5

[m-(Methylmaleimido)phenoxy]acetic acid

Step A: N-(m-carboxymethoxyphenyl)methylmaleamic acid.—By following the procedure described in Example 2, Step A, but substituting methylmaleic anhydride and m-aminophenoxyacetic acid for the maleic anhydride and 3-chloro-4-aminophenoxyacetic acid recited therein, the compound N-(m-carboxymethoxyphenyl)methylmaleamic acid is obtained. The product thus obtained is a solid which is used without further purification in Step B.

Step B: [m-(Methylmaleimido)phenoxy]acetic acid.—By following the procedure described in Example 2, Step B, but substituting N-(m-carboxymethoxyphenyl)methylmaleamic acid for the N-(2-chloro-4-carboxymethoxyphenyl)maleamic acid recited therein, the product [m-(methylmaleimido)phenoxy]acetic acid is obtained. The product is recrystallized from a mixture of ethylene chloride and hexane to yield [m-(methylmaleimido)phenoxy]acetic acid which melts at 158.5–160.5° C.

Analysis.—Calculated for $C_{13}H_{11}NO_5$: C, 59.77; H, 4.24; N, 5.36. Found: C, 60.07; H, 4.18; N, 5.39.

EXAMPLE 6

(4-methylmaleimido-1-naphthyloxy)acetic acid

Step A: N-(4-carboxymethoxy-1-naphthyl)methylmaleamic acid.—By following the procedure described in Example 2, Step A, but substituting methylmaleic anhydride and 4-amino-1-naphthyloxyacetic acid for the maleic anhydride and 3-chloro-4-aminophenoxyacetic acid recited therein, the compound N-(4-carboxymethoxy-1-naphthyl)methylmaleamic acid is obtained. The compound is obtained as a crystalline solid which is used without further purification in the following step.

Step B: (4-methylmaleimido-1-naphthyloxy)acetic acid.—By following the procedure described in Example 2, Step B, but substituting N-(4-carboxymethoxy-1-naphthyl)methylmaleamic acid for the N-(2-chloro-4-carboxymethoxyphenyl)maleamic acid recited therein, the product (4-methylmaleimido-1-naphthyloxy)acetic acid is obtained. The product is recrystallized from a mixture of ethylene chloride and hexane to yield a purified product which melts at 204–206.5° C.

Analysis.—Calculated for $C_{17}H_{13}NO_5$: C, 65.59; H, 4.21; N, 4.50. Found: C, 65.18; H, 4.36; N, 4.28.

EXAMPLE 7

(4-chloromaleimido-1-naphthyloxy)acetic acid

By following the procedure described in Example 3, but substituting chloromaleic anhydride for the dichloromaleic anhydride recited therein, the product 4-chloromaleimido-1-naphthyloxyacetic acid is obtained. The product is recrystallized from a mixture of isopropyl alcohol and water to yield (4-chloromaleimido-1-naphthyloxy)-acetic acid which melts at 220–222° C.

Analysis.—Calculated for $C_{16}H_{10}ClNO_5$: C, 57.93; H, 3.04; N, 4.22. Found: C, 57.72; H, 3.25; N, 4.11.

EXAMPLE 8

(p-dimethylmaleimidophenoxy)acetic acid

By following the procedure described in Example 3, but substituting dimethylmaleic anhydride and (p-aminophenoxy)acetic acid for the dichloromaleic anhydride and (4-amino-1-naphthyloxy)acetic acid recited therein, the product (p - dimethylmaleimidophenoxy)acetic acid is obtained. The product is recrystallized from acetonitrile to yield (p - dimethylmaleimidophenoxy)acetic acid which melts at 224.5–225.5° C.

Analysis.—Calculated for $C_{14}H_{13}NO_5$: C, 61.09; H, 4.76; N, 5.09. Found: C, 61.18; H, 4.97; N, 5.08.

EXAMPLE 9

(p-phenylmaleimidophenoxy)acetic acid

By following the procedure described in Example 3, but substituting phenylmaleic anhydride and (p-aminophenoxy)acetic acid for the dichloromaleic anhydride and (4-amino - 1 - naphthyloxy)acetic acid recited therein, the product (p-phenylmaleimidophenoxy)acetic acid is obtained. The product is recrystallized from acetonitrile to yield (p-phenylmaleimidophenoxy)acetic acid which melts at 178–179° C.

Analysis.—Calculated for $C_{18}N_{13}NO_5$: C, 66.87; H, 4.05; N, 4.33. Found: C, 67.07; H, 4.18; N, 4.27.

EXAMPLE 10

(p-diphenylmaleimidophenoxy)acetic acid

By following the procedure described in Example 3, but substituting diphenylmaleic anhydride and (p-aminophenoxy)acetic acid for the dichloromaleic anhydride and (4-amino - 1 - naphthyloxy)acetic acid recited therein, the product (p - diphenylmaleimidophenoxy)acetic acid is obtained. The product is recrystallized from isopropyl alcohol to yield (p - diphenylmaleimidophenoxy)acetic acid which melts at 200–201° C.

Analysis.—Calculated for $C_{24}H_{17}NO_5$: C, 72.17; H, 4.29; N, 3.51. Found: C, 71.80; H, 4.55; N, 3.53.

EXAMPLE 11

[p-(p-methoxyphenylmaleimido)phenoxy]acetic acid

By following the procedure described in Example 3, but substituting p - methoxyphenylmaleic anhydride and (p - aminophenoxy)acetic acid for the dichloromaleic anhydride and (4 - amino - 1 - naphthyloxy)acetic acid recited therein, the product [p - (p - methoxyphenylmaleimido)phenoxy]acetic acid is obtained. The product is recrystallized from a mixture of ethylene chloride and hexane to yield [p - (p - methoxyphenylmaleimido)phenoxy]acetic acid which melts at 205–206.5° C.

Analysis.—Calculated for $C_{19}H_{15}NO_6$: C, 64.58; H, 4:28; N, 3.96. Found: C, 64.28; H, 4.25; N, 3.93.

EXAMPLE 12

(p-methylmaleimidophenoxy)acetic acid

Step A: N - (p - hydroxyphenyl)methylmaleamic acid.—p-aminophenol (54.5 g., 0.5 mole) is dissolved in 1200 ml. of acetone and methylmaleic anhydride in 25 ml. of acetone is added. After stirring for two hours, the N - (p - hydroxyphenyl)methylmaleamic acid thus obtained is filtered and recrystallized from a mixture of acetone and isopropyl ether to yield N-(p-hydroxyphenyl)-methylmaleamic acid which melts at 163–164° C.

Analysis.—Calculated for $C_{11}H_{11}NO_4$: C, 59.72; H, 5.01; N, 6.33. Found: C, 59.10; H, 5.16; N, 6.29.

Step B: N-(p-carboxymethoxyphenyl)methylmaleamic acid.—By following the procedure described in Example 3, Step A, but substituting N-(p-hydroxyphenyl)methylmaleamic acid for the N-(4-hydroxy-1-naphthyl)maleamic acid dihydrate recited therein, the compound N-(p-carboxymethoxyphenyl)methylmaleamic acid is obtained as a solid which melts at 165–168° C. The product thus obtained is used without further purification in Step C.

Step C: (p-Methylmaleimidophenoxy)acetic acid.—By following the procedure described in Example 2, Step B, but substituting N - (p-carboxymethoxyphenyl)methylmaleamic acid for the N-(2-chloro-4-carboxymethoxyphenyl)maleamic acid recited therein, the product (p-methylmaleimidophenoxy)acetic acid is obtained. The product is recrystallized from a mixture of acetone and water to yield (p-methylmaleimidophenoxy)-acetic acid which melts at 155–156° C.

*Analysis.*—Calculated for $C_{13}H_{11}NO_5$: C, 59.77; H, 4.24; N, 5.36. Found: C, 59.77; H, 4.27; N, 5.33.

EXAMPLE 13

(3-chloro-4-methylmaleimidophenoxy)acetic acid

Step A: N-(2-chloro-4-carboxymethoxyphenyl)methylmaleamic acid.—By following the procedure described in Example 2, Step A, but substituting methylmaleic anhydride for the maleic anhydride recited therein, the product N - (2 - chloro-4-carboxymethoxphenyl)methylmaleamic acid is obtained. The product is obtained in the form of a solid which melts at 125–128° C. and is used without further purification in the following Step B.

Step B: (3-chloro-4-methylmaleimidophenoxy)acetic acid.—By following the procedure described in Example 2, Step B, but substituting N-(2-chloro-4-carboxymethoxyphenyl)-methylmaleamic acid for the N-(2-chloro-4-carboxymethoxyphenyl)maleamic acid recited therein, the product (3-chloro-4-methylmaleimidophenoxy)acetic acid is obtained. The product is recrystallized from a mixture of acetone and water to yield (3-chloro-4-methylmaleimidophenoxy)acetic acid which melts at 135.5–137.5° C.

*Analysis.*—Calculated for $C_{13}H_{10}ClNO_5$: C, 52.80; H, 3.41; N, 4.74. Found: C, 52.26; H, 3.40; N, 4.56.

EXAMPLE 14

[4-(1-cyclopentene-1,2-dicarboximido)-1-naphthyloxy] acetic acid

Step A: N-(4-carboxymethoxy-1-naphthyl)-2-carboxy-1-cyclopentene-1-carboxamide.—By following the procedure described in Example 2, Step A, but substituting 1-cyclopentene-1,2-dicarboxylic acid anhydride and (4-amino-1-naphthyloxy)acetic acid for the maleic anhydride and (3-chloro-4-aminophenoxy)acetic acid recited therein, the compound N-(4-carboxymethoxy-1-naphthyl) - 2 - carboxy - 1 - cyclopentene - 1 - carboxamide is obtained. The product is obtained in the form of a solid which melts at 214–216° C. and is used without further purification in the following Step B.

Step B: [4-(1-cyclopentene-1,2-dicarboximido)-1-naphthyloxy]acetic acid.—By following the procedure described in Example 2, Step B, but substituting N-(4-carboxymethoxy - 1 - naphthyl) - 2 - carboxy - 1 - cyclopentene-1-carboxamide for the N-(2-chloro-4-carboxymethoxyphenyl)maleamic acid recited therein, the product [4 - (1 - cyclopentene - 1,2 - dicarboximido) - 1 - naphthyloxy]-acetic acid is obtained. The product is recrystallized from a mixture of ethylene chloride and hexane to yield [4-(1-cyclopentene-1,2-dicarboximido)-1-naphthyloxy]acetic acid which melts at 235–236.5° C.

*Analysis.*—Calculated for $C_{19}H_{15}NO_5$: C, 67.65; H, 4.48; N, 4.15. Found: C, 67.40; H, 4.83; N, 4.51.

EXAMPLE 15

[p-(1-cyclopentene-1,2-dicarboximido)phenoxy] acetic acid

Step A: N - (p - carboxymethoxyphenyl)-2-carboxy-1-cyclopentene - 1 - carboxamide.—By following the procedure described in Example 2, Step A, but substituting 1-cyclopentene - 1,2 - dicarboxylic acid anhydride and (4-aminophenoxy)acetic acid for the maleic anhydride and (3-chloro-4-aminophenoxy)acetic acid recited therein, the compound N - (p - carboxymethoxyphenyl) - 2 - carboxy-1-cyclopentene-1-carboxamide is obtained. The compound is obtained in the form of a solid which melts at 244–246° C. and is used without further purification in the following Step B.

Step B: [p - (1 - cyclopentene - 1,2-dicarboximido) phenoxy]-acetic acid.—By following the procedure described in Example 2, Step B, but substituting N-(p-carboxymethoxyphenyl) - 2 - carboxy - 1 - cyclopentene-1-carboxamide for the N - (2 - chloro-p-carboxymethoxyphenyl)maleamic acid recited therein, the product [p-(1-cyclopentene - 1,2 - dicarboximido)phenoxy]acetic acid is obtained. The product is recrystallized from ethylene chloride to yield [p-(1-cyclopentene-1,2-dicarboximido)-phenoxy]acetic acid which melts at 194–195.5° C.

*Analysis.*—Calculated for $C_{15}H_{13}NO_5$: C, 62.71; H, 4.56; N, 4.88. Found: C, 62.55; H, 4.52; N, 4.87.

In a manner similar to that described in Example 1, Steps A, B, C and D, for the preparation of (3-chloro-4-dimethylmaleimidophenoxy)acetic acid, many (maleimidoaryloxy)-alkanoic acid products (I) of this invention may be obtained. Thus, by substituting the appropriate nitrophenol, ethyl bromoalkanoate and maleic anhydride for the 3-chloro-4-nitrophenol, ethyl bromoacetate and dimethylmaleic anhydride recited in Example 1, Steps A and D, and following substantially the procedure described in Steps A–D of that example, the (maleimidoaryloxy)alkonic acid products (I) of this invention may be obtained. The following equation illustrates the reaction of Example 1, Steps A–D, and together with Table I, depict the nitrophenol, ethyl bromoalkanoate and maleic anhydride starting materials of the process and the corresponding intermediates and products produced therefrom. The last column of Table I denotes the position of the maleimido group on the (maleimidoaryloxy)alkanoic acid product depicted below as product Id:

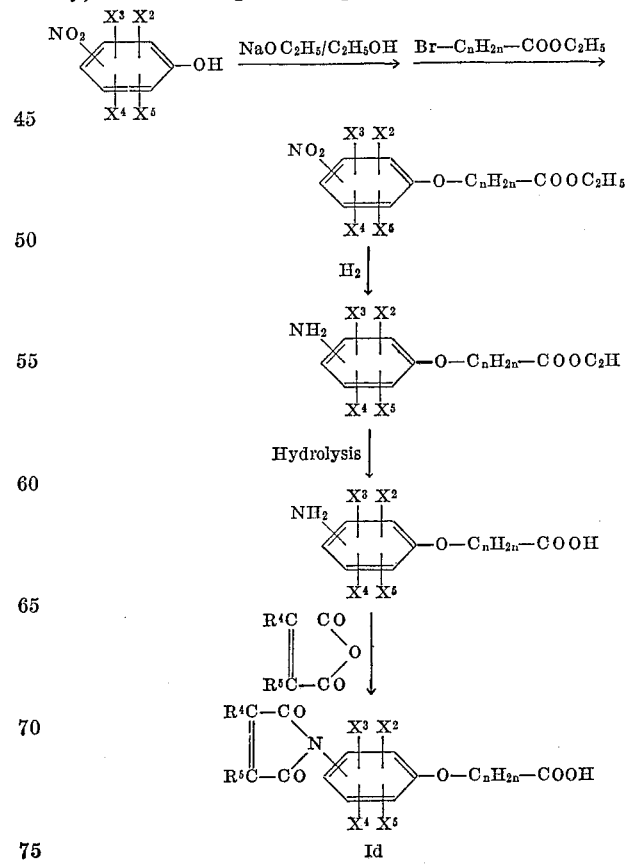

TABLE I

| Ex. | R⁴ | R⁵ | X² | X³ | X⁴ | X⁵ | —$C_nH_{2n}$— | Position |
|---|---|---|---|---|---|---|---|---|
| 16 | Cl | H | H | 3—$CH_3$ | 5—$CH_3$ | H | —$CH_2$—$CH_2$— | 4 |
| 17 | —$CH_3$ | —$CH_3$ | H | 3—Br | H | H | —$CH_2$— | 4 |
| 18 | Cl | H | 2—$CH_3$ | 3—$CH_3$ | H | H | —$CH_2$— | 4 |
| 19 | Cl | Cl | 2—Cl | 3—Cl | H | H | —$CH_2$— | 4 |
| 20 | Cl | H | H | 3—$CH_3$ | H | H | —$CH_2$—$CH_2$— | 4 |
| 21 | —$CH_3$ | —$CH_3$ | H | 3—Cl | H | H | —$CH_2$— | 5 |
| 22 | phenyl | H | H | 3—Br | H | H | —$CH_2$— | 4 |
| 23 | Cl | H | 2—$OCH_3$ | H | H | H | —$CH[CH(CH_3)_2]$— | 4 |
| 24 | —$CH_3$ | —$CH_3$ | 2—Cl | 3—Cl | H | H | —$CH(C_2H_5)CH_2$— | 4 |
| 25 | Cl | Cl | 2,3—CH=CH—CH=CH— | | H | H | —$CH_2$— | 4 |
| 26 | —$CH_3$ | —$CH_3$ | H | 3—$CH_3$ | H | H | —$CH_2$—$CH_2$— | 5 |
| 27 | p-methoxyphenyl | H | H | 3—$CH_3$ | H | H | —$CH_2$—$CH_2$— | 4 |
| 28 | phenyl | phenyl | 2—Cl | 3—Cl | H | H | —$CH_2$— | 4 |
| 29 | Cl | H | 2—$CH_3$ | 3—$CH_3$ | 5—$CH_3$ | 6—$CH_3$ | —$CH_2$—$CH_2$— | 4 |
| 30 | —$CH_3$ | —$CH_3$ | 2—$CH_3$ | H | 4—$CH_3$ | H | —$CH(C_2H_5)CH_2$— | 6 |
| 31 | p-chlorophenyl | H | 2,3—$CH_2$—$CH_2$—$CH_2$—$CH_2$— | | H | H | —$CH_2$— | 4 |
| 32 | phenyl | phenyl | 2—$CH_3$ | H | 5—$CH_3$ | H | —$CH[CH(CH_3)_2]$— | 4 |
| 33 | Cl | Cl | 2—Cl | H | 5—Cl | H | —$CH_2$—$CH_2$— | 4 |
| 34 | p-methoxyphenyl | H | 2,3—$CH_2$—$CH_2$—$CH_2$— | | H | H | —$CH_2$— | 4 |
| 35 | Cl | H | 2—$CH_3$ | H | H | 6—$CH_3$ | —$CH_2$—$CH_2$— | 4 |

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be administered by mixing 50 mg. of a (maleimidoaryloxy)alkanoic acid (I) or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the products of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 36

Dry-filled capsules containing 50 mg. of active ingredient per capsule

Per capsule, mg.
(p-Dimethylmaleimidophenoxy)acetic acid _____ 50
Lactose _____ 144
Magnesium stearate _____ 6

Capsule size No. 3 _____ 200

The (p-dimethylmaleimidophenoxy)acetic acid is reduced to a No. 60 powder and lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of one or more of the other novel compounds of this invention and varying the amounts of the ingredients to obtain the desired dosage.

It will be apparent from the foregoing description that the (maleimidoaryloxy)alkanoic acid product (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

1. A member selected from the group consisting of a compound having the formula:

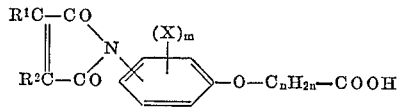

wherein $R^1$ and $R^2$ are similar or dissimilar members selected from the group consisting of hydrogen, halogen, lower alkyl, phenyl and mono-substituted phenyl wherein the nuclear substituents are selected from halogen, lower alkyl and lower alkoxy, and, taken together, $R^1$ and $R^2$ are joined to form an alkylene chain having from there to four carbon atoms between their points of attachment to the maleimido ring, wherein at least one of $R^1$, $R^2$ and X represents a group other than hydrogen; the X radicals are similar or dissimilar members selected from the group consisting of hydrogen, halogen, lower alkyl, lower alkoxy and, taken together, two X radicals on adjacent carbon atoms of the benzene ring are joined to form a chain selected from trimethylene, tetramethylene and 1,3-butadienylene; $m$ is an integer having a value of one to four and $n$ is an integer having a value of one to four; and the nontoxic, pharmacologically acceptable salts, alkyl esters and amides thereof.

2. A product according to claim 1 having the formula:

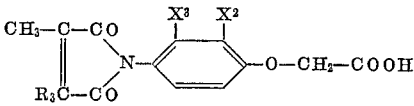

wherein $R^3$ is a member selected from the group consisting of hydrogen, halogen and lower alkyl and $X^2$ and $X^3$ are similar or dissimilar members selected from the group consisting of hydrogen, halogen, lower alkyl and, taken together are joined to form a 1,3-butadienylene chain.

3. The product of claim 2 wherein $R^3$ is lower alkyl and $X^2$ and $X^3$ are hydrogen.

4. The product of claim 2 wherein $R^3$ is hydrogen; $X^2$ is hydrogen and $X^3$ is halogen.

5. The product of claim 2 wherein $R^3$ is hydrogen.

6. The product of claim 1 wherein $R^1$ and $R^2$ are hydrogen and two X radicals on adjacent carbon atoms of the benzene ring are joined to form a chain as defined in claim 1.

7. (p-Dimethylmaleimidophenoxy)acetic acid.
8. (3-chloro-4-methylmaleimidophenoxy)acetic acid.
9. (p-Methylmaleimidophenoxy)acetic acid.
10. (4-maleimido-1-naphthyloxy)acetic acid.

No references cited.

U.S. Cl. X.R.

260—326; 424—274